US008942990B2

(12) United States Patent
Jankowski et al.

(10) Patent No.: US 8,942,990 B2
(45) Date of Patent: Jan. 27, 2015

(54) RETURN FRAUD PROTECTION SYSTEM

(75) Inventors: Peter A. Jankowski, Rancho Santa Fe, CA (US); Chen-Lan Yen, Carlsbad, CA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 0 days.

(21) Appl. No.: 13/154,189

(22) Filed: Jun. 6, 2011

(65) Prior Publication Data

US 2012/0310657 A1 Dec. 6, 2012

(51) Int. Cl.
G06Q 30/02 (2012.01)
G06Q 10/10 (2012.01)
G06Q 10/06 (2012.01)
G06Q 30/06 (2012.01)
G06Q 10/08 (2012.01)
H04N 7/18 (2006.01)

(52) U.S. Cl.
CPC ...................................... *H04N 7/18* (2013.01)
USPC ............................................ 705/1.1; 348/143

(58) Field of Classification Search
USPC .................................... 348/143; 705/1.1–912
See application file for complete search history.

(56) References Cited

U.S. PATENT DOCUMENTS

| 7,561,182 | B2 | 7/2009 | VanCleave et al. | |
|---|---|---|---|---|
| 7,634,662 | B2 | 12/2009 | Monroe | |
| 7,843,491 | B2 * | 11/2010 | Vallone et al. | 348/143 |
| 2003/0040925 | A1 | 2/2003 | Gutta et al. | |
| 2007/0050305 | A1 * | 3/2007 | Klein | 705/67 |
| 2010/0150407 | A1 * | 6/2010 | Cheswick | 382/118 |
| 2011/0063108 | A1 * | 3/2011 | Aonuma et al. | 340/540 |

OTHER PUBLICATIONS

"3 Step Strategy to Manage Receipt Fraud: Deter, Detect, Convict", [online]. Retrieved from the Internet: <URL: http://central.fraudfighter.com/fraud-fighter-blog/bid/41868/3-Step-Strategy-to-Manage-Return-Receipt-Fraud-Deter-Detect-Convict>, (Jun. 15, 2010), 3 pgs.
"Searchable Surveillance for Hotels & Casinos", including Section on "Smart Surveillance Prevents Theft", (*White Paper prepared by 3VR Security, Inc.*), (Feb. 20, 2007), 12 pgs.

* cited by examiner

*Primary Examiner* — Jonathan Ouellette
(74) *Attorney, Agent, or Firm* — Schwegman Lundberg & Woessner, P.A.

(57) ABSTRACT

A method and a system for determining a return fraud at a store are described. The return fraud protection system has a video recording module, a face capture module, a face icon generator module, and an entrance video clip module. The video recording module records a video at an entrance of the store. The face capture module captures a face of a customer entering the store from the video. The face icon generator module generates a face icon comprising the face of the customer. The entrance video clip generator module generates a video clip of the customer entering the store, associates the video clip of the customer with the corresponding face icon, and provides a client device with a list of face icons with corresponding video clips.

19 Claims, 12 Drawing Sheets

|  | GATEWAY 200 | | |
|---|---|---|---|
| API | CAMERA API 213 | ACCESS CONTROL API 216 | OTHER API 222 | . . . . .
| MODULES | CAMERA MODULE 214 | ACCESS CONTROL MODULE 218 | OTHER MODULE 224 | . . . . .
| DRIVERS | CAMERA DRIVERS 216 | ACCESS CONTROL DRIVERS 220 | OTHER DRIVERS 226 | . . . . .

FIG. 2B

RETURN FRAUD PROTECTION SYSTEM

TECHNICAL FIELD

This application relates generally to the field of computer technology, and in a specific example embodiment, to a return fraud protection system.

BACKGROUND

Retail stores lose a significant portion of revenue annually due to fraudulent behavior, such as stolen merchandise or fraudulent returns. For example, it is not uncommon for an individual to enter a store, pick up an item, pretend that they have previously purchased the item and then attempt to return the item without a receipt. It is difficult for a retailer to monitor the behavior of every customer that enters a given store.

In addition, due to the competitive nature of the retail environment, most retailers are forced to maintain relatively liberal return policies that allow merchandise to be returned without a receipt under certain conditions. Thus, retailers have been unable to effectively prevent or even discourage such fraudulent merchandise returns.

BRIEF DESCRIPTION OF THE DRAWINGS

Embodiments of the invention are illustrated by way of example, and not by way of limitation, in the figures of the accompanying drawings in which:

FIG. 2B is a block diagram illustrating another example embodiment of a gateway;

DETAILED DESCRIPTION

Although the embodiments of the invention have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a method and a system for determining a return fraud at a store are described. The return fraud protection system has a video recording module, a face capture module, a face icon generator module, and an entrance video clip module. The video recording module records a video at an entrance of the store. The face capture module captures a face of a customer entering the store from the video. The face icon generator module generates a face icon comprising the face of the customer. The entrance video clip generator module generates a video clip of the customer entering the store, associates the video clip of the customer with the corresponding face icon, and provides a client device with a list of face icons with corresponding video clips.

Figure 1:
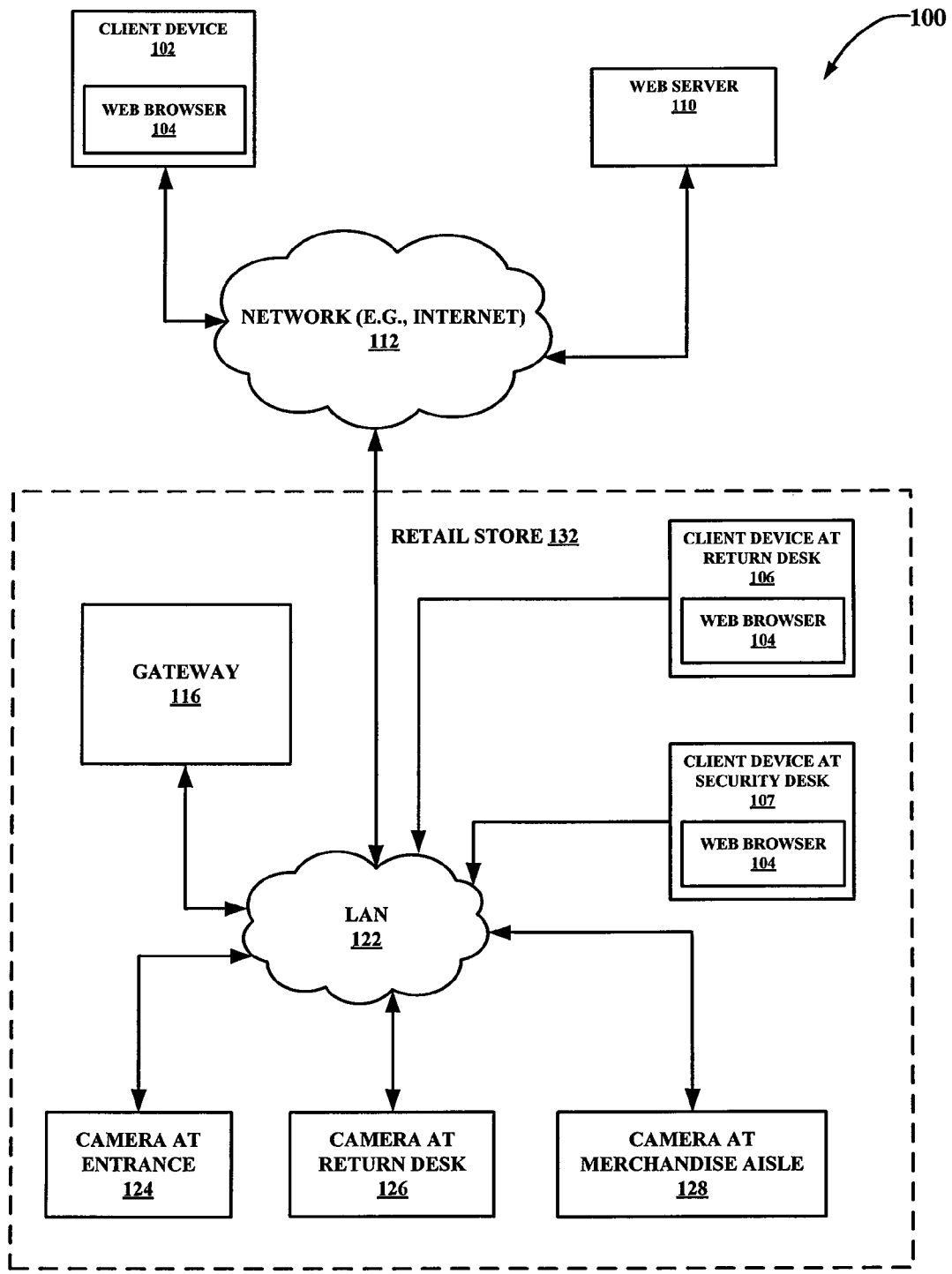
FIG. 1 is a network diagram depicting a return fraud protection network system, according to one embodiment.

FIG. 1 is a network diagram depicting a network system 100, according to one embodiment, for exchanging data over a computer network 112 (e.g. TCP/IP network). For example, the network system 100 comprises a client device 102 outside a retail store 132, a client device 106 at a merchandise return desk, a client device 107 at a security desk, a web server 110, and a gateway 116 at the retail store 132.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiment that the connection(s) be established for the sole purpose of exchanging information.

The client device 102 is connected to the computer network 112. The client device 102 can include, but are not limited to, a desktop computer, a laptop computer, a mobile computing device, a mobile smart phone device, and so forth. A network interface means is provided to enable the client device 102 to send and receive data to and from the computer network 112. The client device 102 may include a web browser 104 that may be in communication with the web server 110 via the computer network 112. In another example, the client device 102 includes a programmatic client, such as a client application (not shown) configured to communicate with the web server 110 via the computer network 112. The web browser 104 may be used to display some or all of the information and monitoring data provided by gateway 116.

The computer network 112 can include a local area network (LAN) where Gigabit Ethernet switches are used to switch data. In another example, the computer network 112 includes a wide area network, such as the Internet. In general, computer network 112 may be a public network or private network, a single network or a combination of several networks. In most embodiments, computer network 112 may be, but is not required to be, an IP-based network. In some embodiments it may be desirable for all or a portion of network 112 to include publicly available networks, such as the Internet, to avoid the need for installing, purchasing, or leasing additional infrastructure.

The web server 110 may also connect to the computer network 112 both to receive and transmit data. The web server 110 may also be referred to as a web-based host. The web server 110 is connected to the computer network 112 by a means of a network interface. The network interface can take the form of a network interface card (not shown) installed in the web server 110 to enable data to be sent and received to and from the computer network 112 by the web server 110.

In one embodiment, the web server 110 identifies the gateway 116 for the client device 102 to communicate with, so as to monitor and/or control the security devices connected to the gateway 116.

In another embodiment, the web server 110 may provide server-side functionality, via the computer network 112, to the client device 102. The client device 102 may enable users that utilize the network system 100 and more specifically, the web server 110, to view monitoring data (e.g. audio/video feed) from security devices connected to the gateway 116 over the computer network 112. These transactions may include transmitting, receiving (communicating) and processing data to, from, and regarding monitoring data and users of the network system 100. The data may include, but are not limited to audio, video, picture, metadata, camera configuration data, client device configuration data, and network data monitoring data. The web server 110 can provide other functions including storing monitoring data to an internal or external disk storage device (not shown), playing back recorded monitoring data, among others.

In one embodiment, the web server 110 may include a directory of gateways and the location of corresponding connected security devices. The web server 110 is described in more detail below with respect to FIGS. 2A, 2B, and 2C. As such, the web server 110 may correlate the gateway 116 to the cameras 124, 126, and 128 in the retail store 132. In one embodiment, the correlation may be generated pursuant to pre-defined settings or configuration based on user profile, organization topology, hierarchy, bandwidth and other factors. For example, a user at client device 102 may be a manager responsible for stores located on the West coast. If sites A and B are on the West coast, the web server correlates gateway 116 to retail store 132. As such, based on the user profile and the organization topology, the user can access only gateway 116 to obtain monitoring data from sites A and B. In other words, the user does not have to communicate directly with several gateways to monitor all security devices attached to the corresponding gateways. In another embodiment, the web server 110 may correlate gateway 116 with other gateways. In yet another embodiment, the other gateways may be correlated with other gateways.

Generally, the gateway 116 includes a processor-based device that operates to monitor conditions at the retail store 132. For example, the gateway 116 can be configured to analyze the monitoring data, to detect alarm conditions at the retail store 132, to capture information relating to such alarm conditions, and to send such monitoring information to client devices 102, 106 and 107.

The gateway 116, located at the retail store 132, is connected by way of a local area network LAN 122 to local client devices 106 and 107. The client device 106 may be located at an item return location or a merchandize return desk of the retail store 132. The client device 107 may be located at a security location or a security desk of the retail store 132.

The client devices 106 and 107 each may include a web browser 104 similar to the web browser 104 of client device 102. The web browser 104 may be configured to communicate with gateway 116 and retrieve monitoring data (video clips) from gateway 116.

In one embodiment, the client device 106 at the item return location in the retail store 132 alerts the client device 107 of a customer attempting to return an item without a receipt at the item return location of the retail store 132. The client device 107 at a security office location of the retail store 132 receives a list of face icons with corresponding video clips in response to the alert from the client device 106. The client device 107 then notifies the client device 106 of a potential return fraud based on the video clip of the customer entering the store from the list of face icons.

Security devices (e.g. monitoring devices and controlling devices) may include cameras 124, 126, and 128 connected to the gateway 116 via LAN 122. Monitoring devices include, for example, sensors, microphone, cameras. The gateway 116 is not limited to connecting to any specific type or model of sensors or monitoring devices. Any sensor may be used, depending on the desired type and level of protection. Examples include, without limitation, microphones, cameras, magnetic contact switches, audio sensors, infrared sensors, motion detectors, fire alarms, occupancy sensors, and thermal sensors. For illustration purposes, the retail store 132 in FIG. 1 includes a camera 124 at the entrance of the retail store 132, a camera 126 at the item return location of the retail store 132, and a camera 128 at each merchandize aisle of the retail store 132.

In one embodiment, the camera 124 is positioned at the entrance of the retail store 132 such that it can capture the video of a customer walking into the retail store 132 and capture the face of the customer.

In one embodiment, the camera 126 is positioned at the return desk of the retail store 132 such that it can capture the video of a customer at the item return location of the retail store 132 and capture the face of the customer.

In one embodiment, the camera 128 is positioned at a merchandize aisle of the retail store 132 such that it can capture the video of a customer walking in that corresponding merchandize aisle and capture the face of the customer.

For illustration purposes, the gateway 116 may also be connected to controlling devices in the retail store 132 that include devices that can be controlled such as a HVAC system (e.g. heater/air conditioning system including thermometer, smoke sensor, thermostat), a gate/door lock, a camera positioning system (e.g. tilt, pan).

Figure 2A:
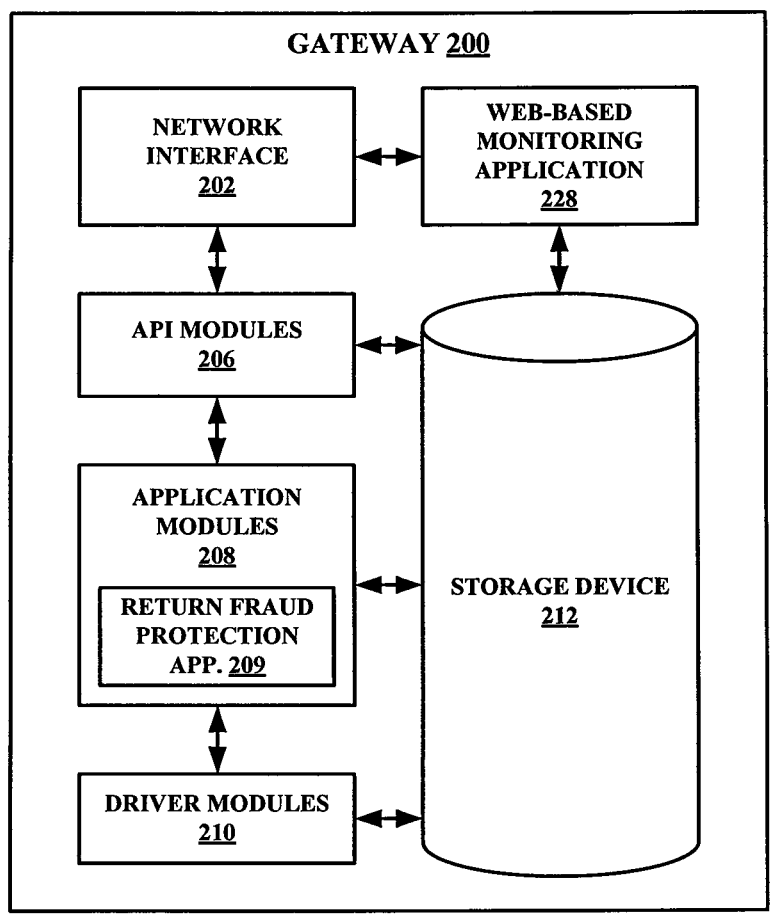
FIG. 2A is a block diagram illustrating an example embodiment of a gateway.

FIG. 2A is a block diagram illustrating an example embodiment of a gateway 200. The gateway 200 includes a network interface 202, API modules 206, application modules 208, driver modules 210, a web-based monitoring application 228, and a storage device 212. The network interface 202 enables the gateway 200 to communicate with the computer network 112. The application programming interface (API) module 206 enable the gateway 200 to interface with the client devices 102, 106, the web server 110, and other third party devices (not shown). The application modules 208 enable the gateway 200 to monitor or control the corresponding monitoring or controlling devices connected to the gateway 200. In addition, the application modules 208 enable the gateway 200 to provide add-on expandable services discussed further below. The driver modules 210 include device drivers to enable interaction of the application modules 208 with the hardware of the corresponding monitoring or controlling devices. The web-based monitoring application 228 enables the gateway 200 to communicate monitoring and controlling data with the client device. The web-based monitoring application 228 is discussed in more detail with respect to FIG. 2C. The storage device 212 may be used to store monitoring data from the monitoring devices connected to the gateway 200, APIs from API modules 206, software applications from application modules 208, device drivers from driver modules 210, and a configuration of the gateway 200. For example, the configuration of the gateway 200 may include a topology or hierarchy at a user level, organization level, partner level. The configuration of the gateway may include specifically an enterprise configuration of gateway (based on the topology/hierarchy previously mentioned). In one embodiment, the configuration of the gateway 200 may be replicated to other gateways that are correlated by the web server based on the topology/hierarchy. For example, some gateway can have access control to a limited number of security devices. In another embodiment, each gateway may be custom configured. In another embodiment, the gateway 200 is configured to aggregate data from multiple gateways (that may be correlated by the web server 110 based on the topology) and present the aggregated data to the client device.

FIG. 2B is a block diagram illustrating another example embodiment of the gateway 200. For example, the gateway 200 includes a camera API 213, a camera application module 214, and camera drivers 215. The camera API 213 provides an interface to the web browser 104 or the client application 108 of a client device to receive and send data from a camera connected to the gateway 200. The camera application module 214 enables the client device to receive data (e.g. audio and video) from the camera via the camera API 213. In another embodiment, the camera application module 214 enables the client device to send data to the camera (e.g. focus, tilt, pan, zoom) to the camera via the camera API 213. The camera drivers 215 include one or more drivers for different brands or manufacturers of cameras.

In another example, the gateway 200 also includes an access control API 216, an access control module 218, and access control drivers 220. The access control API 216 provides an interface to the web browser 104 or a client application 108 of a client device to receive and send data from an access control device (e.g., a door access at a monitored site) connected to the gateway 200. The access control module 218 enables the client device to receive data (e.g., time and ID log of the door access at the monitored site) from the access control device via the access control API 216. In another embodiment, the access control module 218 enables the client device to send data to the access control device (e.g. open, close, lock door) to the access control device via the access control API 216. The access control drivers 220 include one or more drivers for different brands or manufacturers of access control devices.

One advantage of one of the embodiments of the gateway 200 is the ability to easily connect additional devices or third-party devices. This is illustrated with respect to other API 222, other module 224, and other drivers 226. As such, the gateway 200 is not limited to any particular manufacturer of devices or brand of devices. The gateway 200 allows for easy expansion and plug-in features using additional APIs, corresponding modules, and corresponding device drivers.

Figure 2C:
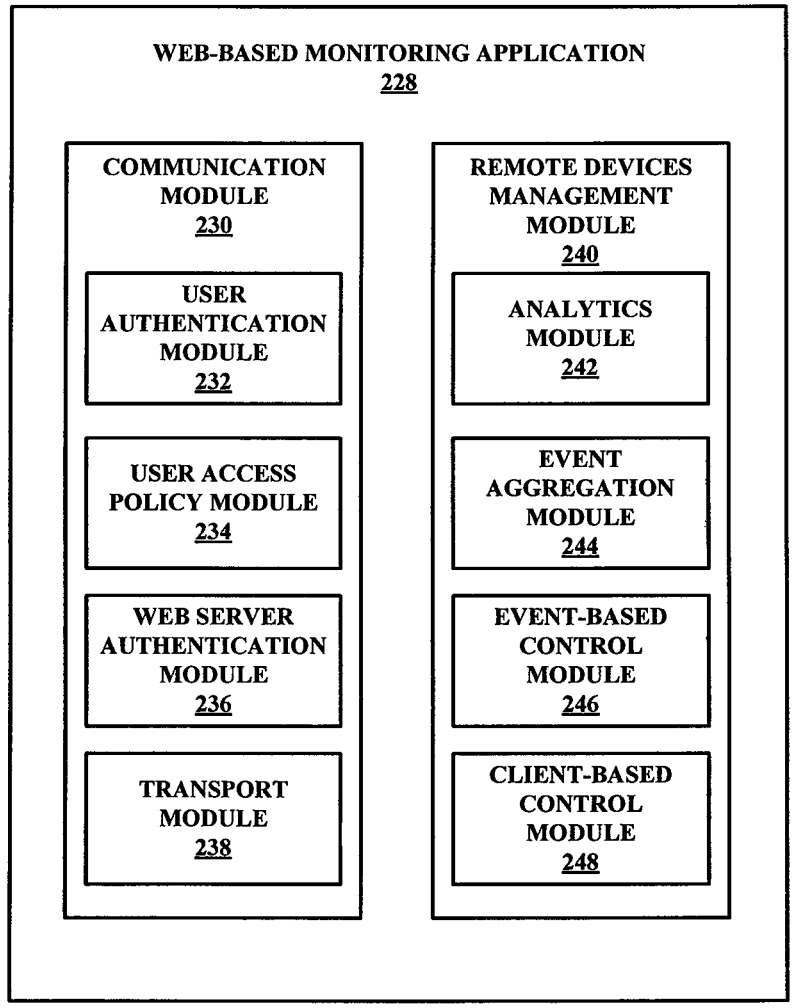
FIG. 2C is a block diagram illustrating an example embodiment of a web-based monitoring application of a gateway.

FIG. 2C is a block diagram illustrating an example embodiment of a web-based monitoring application 228 of the gateway 200. The web-based monitoring application 228 enables client devices to remotely monitor and control monitoring and controlling devices connected to the gateway 200 via the web browser 104 at the client devices 102, 106, and 107.

In one embodiment, the web-based monitoring application 228 includes a communication module 230 and a remote devices management module 240. The communication module 230 enables communication between the gateway 200 and the client devices 102, 106, and 107. The remote devices management module 240 enables the client devices 102, 106, and 107 to monitor and/or control the monitoring or controlling devices (e.g., cameras 124, 126, 128) connected to the gateway 200.

For example, the communication module 230 includes a user authentication module 232, a user access policy module 234, a web server authentication module 236, and a transport module 238.

The user authentication module 232 authenticates a user at the client device based on a user profile of the user. An example of user authentication may include verifying the username and password provided by the client device with a predefined user profile. The predefined user profile may be stored in the storage device 212 or at the web server 110.

The user access policy module 234 limits or grants the user at the client device access to the monitoring and/or controlling devices connected to the gateway 200. For example, a user with limited privilege may have access to the monitoring data to a particular site (e.g., first floor only) or a specific monitoring device (e.g. HVAC only). On the other hand, a user with executive privilege may not only be able to view monitoring data, but also to control security devices from more sites.

The web server authentication module 236 authenticates a communication between the gateway 200 and the web server 110. For example, the gateway 200 transmits a unique token to the web server 110 for authentication prior to establishing the secured communication. Those of ordinary skills in the art will recognize that other means of authentication between the gateway 200 and the web server 110 may be used.

The transport module 238 enables peer-to-peer communication between gateways. As such, a client device communicating with one gateway at a first location is also able to communicate with another gateway at a second location.

For example, the remote devices management module 240 of the web-based monitoring application 228 includes an analytics module 242, an event aggregation module 244, an event-based control module 246, and a client-based control module 248.

The analytics module 242 analyzes audio/video, and other detected changes from the monitoring devices and generates events based on the analysis. For example, the analytics module 242 is capable of determining how many people have entered or left an activity zone (e.g., a room, a hallway) in a video feed, the direction of the movement of individuals in a video feed, the temperature of individuals in a video feed, facial recognition of individual in a video feed, and so forth. Events are generated based on the analysis and predefined user-configured settings. A user at the client device is able to configure the conditions for generating an event from the web browser 104 of the client device 102.

The event aggregation module 244 aggregates events generated from the analytics module 242. For example, events generated based on the analysis and predefined/user-configured settings are aggregated in a log stored in a storage device attached to the gateway 200, in a storage device attached to another gateway, in a storage device attached to the web server 110, or in a storage device connected to the client device.

The event-based control module 246 communicates a command to at least one controlling device connected to the corresponding gateway based on an event identified in event aggregation module 244 based on an event configuration. For example, an event comprises a temperature of a room reaching a predefined maximum temperature. The event-based control module 246 may communicate to the HVAC system to turn on the air conditioning system for the room if such event an occurs.

The client-based control module 248 communicates a command to one or more controlling devices of the corresponding gateway based on a command initiated and communicated from the client device. For example, a user at the client device may initiate a command to pan a camera connected to the gateway 116. Such a command would be communicated to the camera via the client-based control module 248.

Figure 2D:
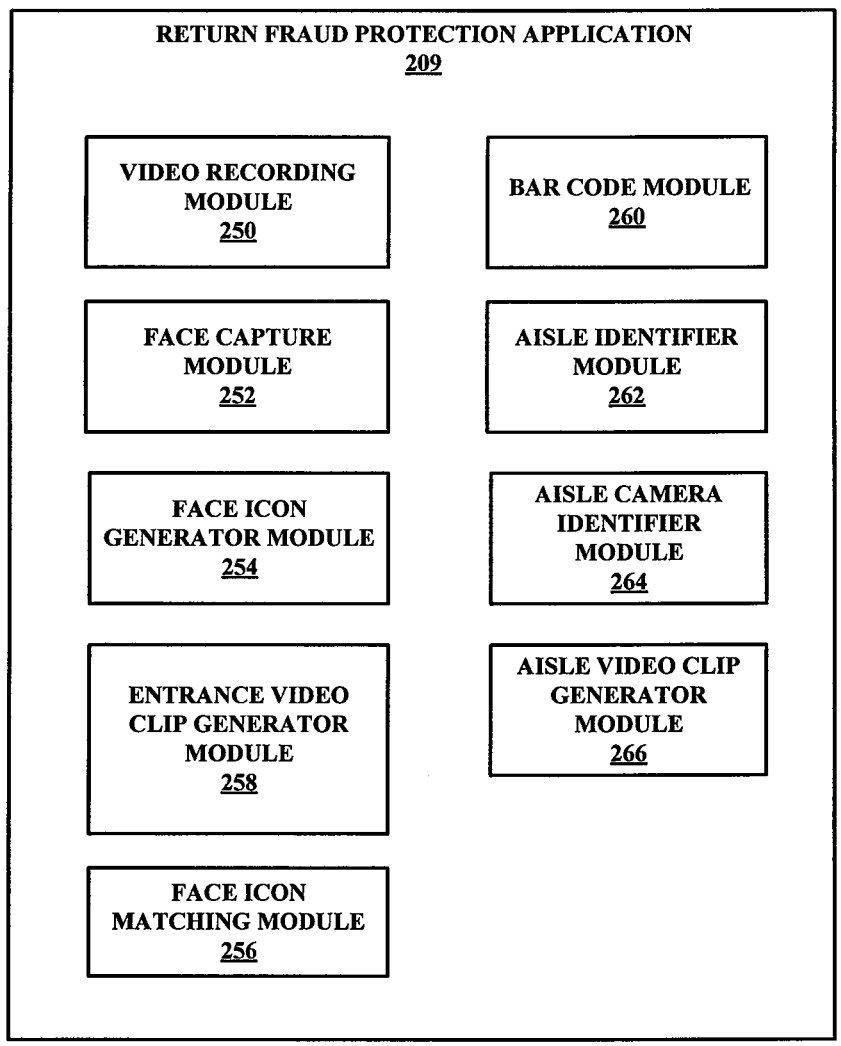
FIG. 2D is a block diagram illustrating an example embodiment of a return fraud protection application.

FIG. 2D is a block diagram illustrating an example embodiment of a return fraud protection application 209 of the gateway 200. The return fraud protection application 209 enables client devices 102, 106, and 107 to retrieve video clips of customers walking in the retail store 132.

In one embodiment, the return fraud protection application 209 includes a video recording module 250, a face capture module 252, a face icon generator module 254, a face icon matching module 256, an entrance video clip generator module 258.

In another embodiment, the return fraud protection application 209 also includes a bar code module 260, an aisle identifier module 262, an aisle camera identifier module 264, and an aisle video clip generator module 266.

The video recording module 250 enables recording of video from the cameras 124, 126, and 128. In one embodiment, the video recording module 250 captures video from the entrance of the retail store 132, at the return desk of the retail store 132, and at a merchandize aisle of the retail store 132. The video recording module 250 includes for example video capture software.

The face capture module 252 captures a face of a customer entering the retail store 132 from the video recorded by the entrance camera 124. The face capture module 252 can also capture the face of the customer at the item return location in the retail store 132. A face capture software captures the face in a frame of the video from the camera 124. In one embodiment, the face capture module 252 does not necessarily include a facial recognition algorithm to determine a unique pattern of the face of the customer. The face capture module 252 may be configured to determine and delineate a face of a person (e.g., a customer walking in the retail store 132) in the frame of the video.

The face icon generator module 254 generates a picture icon or a face icon of the captured face of the customer as provided by the face capture module 252.

Figure 9:
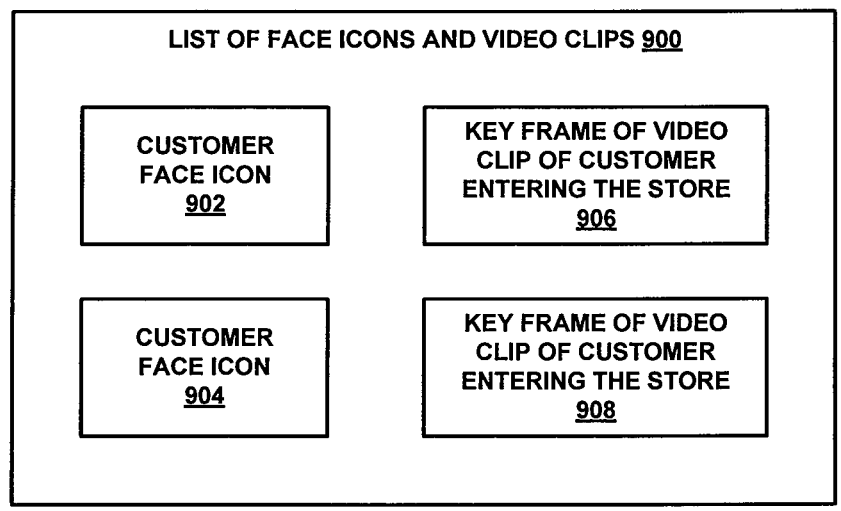
FIG. 9 is an example diagram of a list of face icons with corresponding video clips displayed at the client device.

The entrance video clip generator module 258 generates a video clip of the customer entering the retail store 132. In one embodiment, the entrance video clip generator module 258 associates the video clip of the customer entering the retail store 132 with the corresponding face icon. The entrance video clip generator module 258 further provides the client devices 102, 106, and 107 with a list of face icons with the corresponding video clips. An example of a list 900 of face icons and corresponding video clips is illustrated in FIG. 9. For example, a customer face icon 902 is shown next to a key frame of a video clip 906 of the corresponding customer entering the retail store 132. Similarly, a customer face icon 904 is shown next to a key frame of a video clip 908 of the corresponding customer entering the retail store 132. As such, when the frame of the video clip 906 is clicked on, the corresponding video clip is played on the client devices 102, 106, and 107.

In another embodiment, the key frame may be selected from a most relevant frame showing the customer entering the store. For example, an algorithm determines the most distinguishable (e.g. clearest, most relevant) key frame of the customer from the video clip. For example, an algorithm may analyze the motion of the body from the customer entering the store and determine the most relevant key frame based on the position of the body. One or more key frames may be provided as part of the list 900.

For example, the system may capture the face of each member of a family or a group of people entering the storing at the same time. As such, the customer face icon 902 may include the face of a parent along with a corresponding key frame 906 that includes all members of the family. Similarly, the customer face icon 904 may include the face of a child accompanying the parent along the same corresponding key frame 906 that includes all members of the family. In one example, although the parent is not carrying the returned item, the child may be carrying the returned item. In such scenario, the list 900 would provide the same key frame for both the customer face icon of the parent and the customer face icon of the child.

In one embodiment, the entrance video clip generator module 258 provides the client devices 102, 106, and 107 with the list of face icons of the faces of the customers as shown in FIG. 9 entering the retail store 132 after the opening of the retail store 132 and before the closing of the retail store 132 in a same day.

The customer service representative at the return desk location only needs to retrieve video clips of customers who have entered on the same day that they are attempting to return their item without a receipt. As such; the entrance video clip generator module 258 only needs to generate video clips as far back as the time the retail store 132 opened that same day.

In one embodiment, the customer service representative at the return desk reviews the list 900 of FIG. 9 when a customer is attempting to return an item without a receipt. The customer service representative manually makes the determination from viewing the list 900 and the video clips of whether the customer previously entered the store without the returned item in hand that same day.

In another embodiment, the entrance video clip generator module 258 receives from the client device 106 at the return desk a notification of a customer attempting to return an item without receipt at the item return location in the retail store 132 (typically, customer service area). In response, the entrance video clip generator module 258 provides the client device 106 with the list 900 of face icons of the faces of the customers entering the retail store 132 within a predetermined amount of time (e.g., within the last ten minutes, one hour, and so forth) from receiving the notification from the client device 106. A customer service representative may manually activate the notification at the client device 106. For example, the customer service representative may press on a particular icon or button if the customer is attempting to return an item without a receipt.

Furthermore, the face icon matching module 256 matches the face of a customer captured at the item return location in the retail store 132 from camera 126 with the face of a customer captured at the entrance of the retail store 132 from camera 124. In one embodiment, the face of the customer entering the store and the face of the customer at the item return location in the store are captured on the same day. In another embodiment, the face icon matching module 256 provides one or more of the closest matched face icons of customers at the item return location and the entrance of the retail store.

In one embodiment, the entrance video clip generator module 258 matches the captured face of the customer at the entrance with the captured face of the customer at the return desk. The entrance video clip generator module 258 then provides the client devices 102, 106, and 107 with a video clip of the customer with the matched face entering the retail store 132. The face matching may be performed, for example, by using a facial recognition algorithm.

The bar code module 260 identifies an item or a product based on a bar code of the item being returned at the item return location in the retail store 132. For example, the customer service representative at the return location may scan or manually enter the bar code or any other identifiable marking on the item using a keypad or a bar code scanner attached to the client device 106. In one embodiment, the storage device 212 of gateway 116 may store a table (not shown) of bar code identifications along with corresponding item/product identifications, aisle identification, and camera identification. In another embodiment, the table may be stored in another device such as in the web server 110 or the client device 106.

The aisle identifier module 262 identifies an aisle in the retail store 132 corresponding to the identified item from the bar code module 260. In one embodiment, the aisle identifier module 262 consults the table in the storage device 212 to determine the aisle in the retail store 132 where items similar to the item being returned is stored or displayed. For example, an item identified as a toy may be typically located in a particular aisle of a toy section of the retail store 132.

The aisle camera identifier module 264 identifies a camera associated with the aisle in the retail store 132. For example, there may be at least one camera placed at each aisle in the retail store 132. Or there may be a camera aimed at several aisles in the retail store 132. Accordingly, the aisle camera identifier module 264 identifies the camera associated with the identified aisled.

The aisle video clip generator module 266 generates a video clip of the identified aisle in the retail store 132 within a predetermined amount of time from the time the item is being returned at the item return location in the retail store 132. For example, the aisle video clip generator module 266 may generate a video clip of the last ten minutes from the identified camera at the client device 106. As such, the customer representative at the return desk or the security officer associated with the retail store 132 can monitor and determine whether the customer was indeed taking an item off the shelves in the corresponding aisle of the returned item. In one embodiment, the security officer is located either in the retail store 132 or located off site. In another embodiment, the security officer at an offsite location may be able to monitor several retail stores from a client device.

Figure 3:
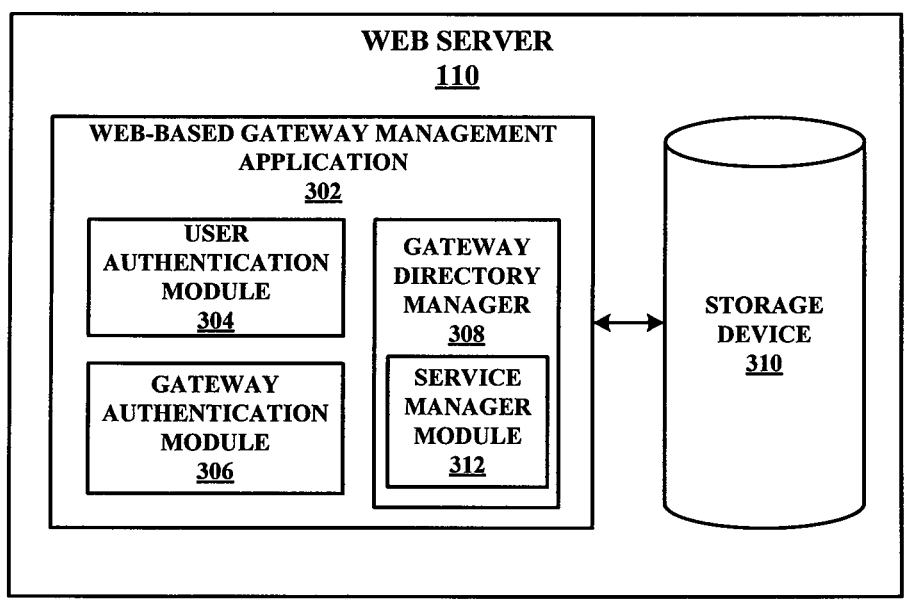
FIG. 3 is a block diagram illustrating an example embodiment of a web server.

FIG. 3 is a block diagram illustrating an example embodiment of a web server 110, also referred to as a web-based host. The web server 110 comprises a web-based gateway management application 302 and a storage device 310. The web-based gateway management application 302 identifies a gateway associated with a user at the client device, authenticates the user at the client device, and authenticates the identified gateway.

In one embodiment, the web-based gateway management application 302 includes a gateway directory manager 308, a user authentication module 304, and a gateway authentication module 306. The gateway directory manager 308 identifies a gateway associated with a user profile. For example, a user may only be able to access a particular gateway or a particular set of devices connected to a gateway. As such, a West coast manager of an organization may be able to access monitored sites only from West coast stores of the organization. In contrast, a user with higher privileges may be able to access more gateways and devices. As such, the CEO of an organization with stores throughout the U.S. may be able to view monitoring data from all the stores in the U.S.

In another embodiment, the gateway directory manager 308 includes a service manager module 312 to enable add-on services to the user at the client device. For example, the add-on services include, but are not limited to, remote storage, remote audio, two-way audio, dynamic backup, or reporting based on the user profile.

The user authentication module 304 authenticates the web server 110 with the user at the client device based on the user profile. For example, the web server 110 verifies the username and password of the user at the client device.

The gateway authentication module 306 authenticates the identified gateway. For example, the web server 110 receives a unique token from the identified gateway to authenticate the identified gateway prior to establishing secured communication between the web server and the gateway.

The storage device 310 may be used to store user profiles, tokens from gateways, a directory of gateways with corresponding devices, services from the gateways, a directory of gateways associated with a user profile, and a directory of connected security devices associated with a user profile.

Figure 4:
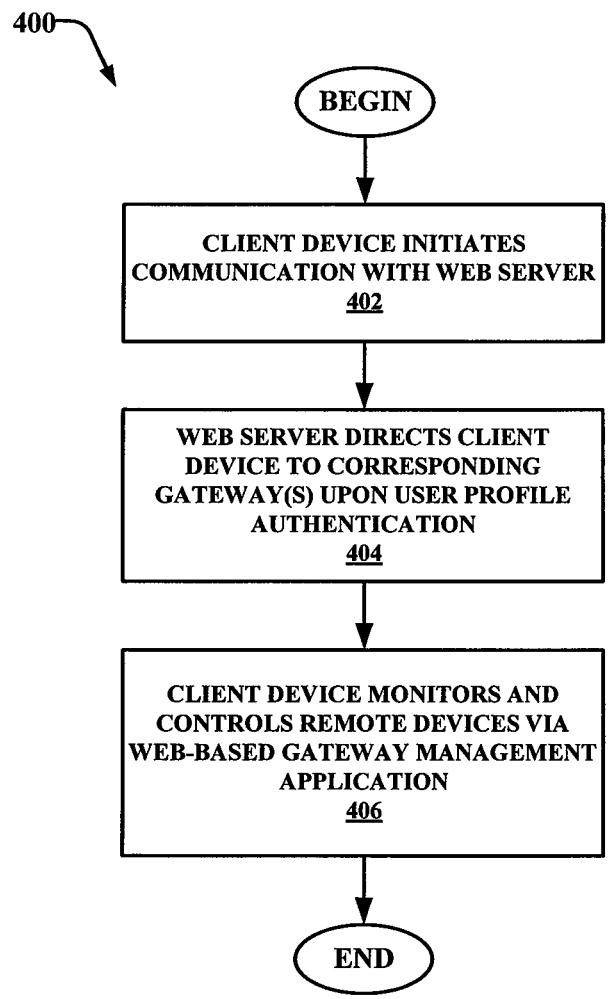
FIG. 4 is a flow chart of one embodiment of an example method for monitoring and controlling devices attached to a gateway.

FIG. 4 is a flow chart of one embodiment of an example method 400 for monitoring and controlling devices attached to a gateway. At 402, a user at a client device initiates communication with a web server to access monitoring data from the devices connected to a gateway. At 404, the web server directs the client device to the corresponding gateway based on the user profile of the user at the client device. At 406, the client device is able to monitor and control from a central interface monitoring and controlling devices connected to the identified gateway(s). In one embodiment, the client device receives an aggregated view of all security devices from several correlated gateways by communicating with only one gateway.

Figure 5:
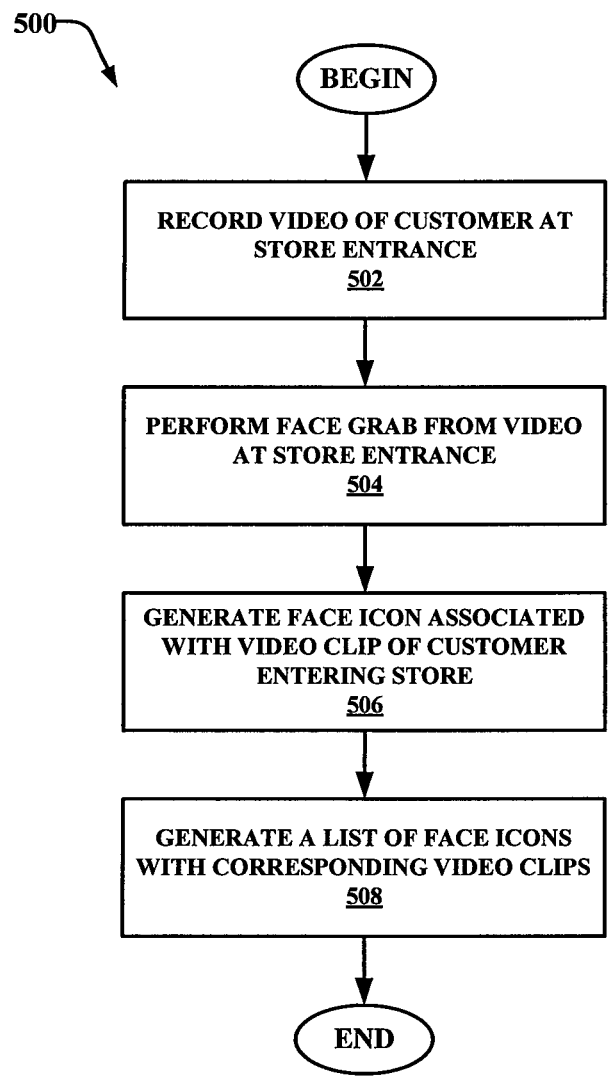
FIG. 5 is a flow chart of one embodiment of an example method for a return fraud protection system.

FIG. 5 is a flow chart of one embodiment of an example method 500 for a return fraud protection system. At 502, a video at an entrance of a store is recorded. The video may include a series of pictures with or without audio. At 504, the face of a customer entering the store is captured (also referred to as face grab) from a frame of the recorded video. At 506, a face icon or picture comprising the face of the customer is generated and associated with the video clip of the customer with the corresponding face icon. At 508, a list of face icons with corresponding video clips is generated and provided to the client device. In one embodiment, the client device is provided with the list of face icons of the faces of the customers entering the store in one day after the opening of the store and before the closing of the store in a same day. In another embodiment, the client device issues a notification of a customer attempting to return an item without receipt at an item return location in the store. In response, a list of face icons of the faces of the customers entering the store within a predetermined amount of time from receiving the notification is received at the client device.

Figure 6:
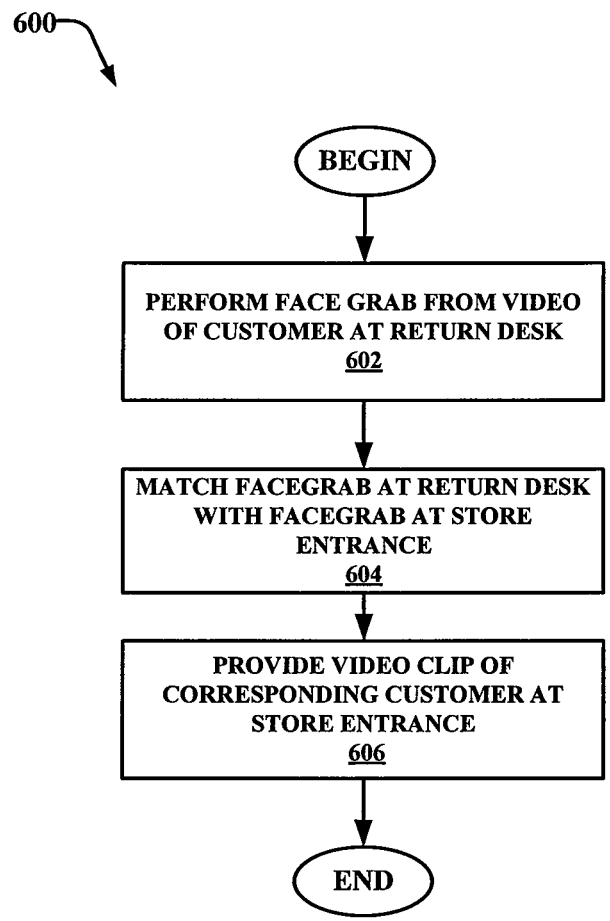
FIG. 6 is a flow chart of one embodiment of another example method for a return fraud protection system.

FIG. 6 is a flow chart of one embodiment of another example method 600 for a return fraud protection system. At 602, the face of the customer at the item return location in the store is captured (i.e. face grab). At 604, the face of the customer captured at the item return location in the store is matched with the face of a customer captured at the entrance of the store. In one embodiment, the face of the customer entering the store and the face of the customer at the item return location in the store are captured on the same day. At 606, the client device is provided with a video clip of the customer with the matched face entering the store.

Figure 7:
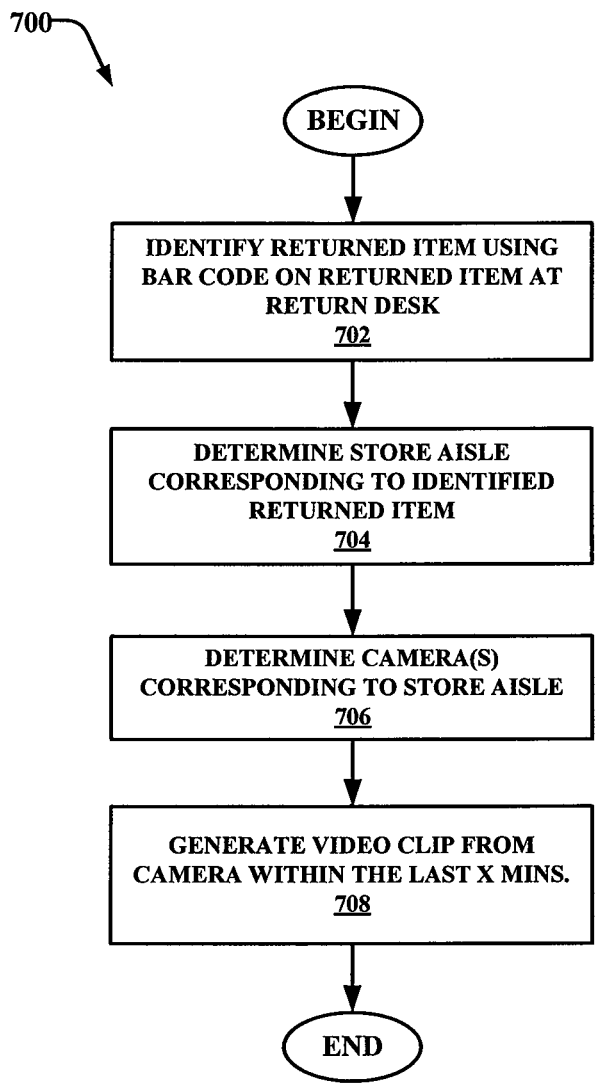
FIG. 7 is a flow chart of one embodiment of another example method for a return fraud protection system.

FIG. 7 is a flow chart of one embodiment of another example method 700 for a return fraud protection system. At 702, an item being returned at the item return location in the store is identified based on its bar code. At 704, an aisle in the store corresponding to the identified item is identified. At 706, a camera associated with the aisle is identified. At 708, a video clip of the identified aisle in the store is generated within a predetermined amount of time from the time when the item is being returned at the item return location in the store.

In one embodiment, a client device at a security office location is alerted of a customer attempting to return an item without a receipt at the item return location. A list of face icons with corresponding video clips is sent in response to the alert to the client device at the item return location. The client device can be notified of a potential return fraud in response to a warning from the client device at the security office location.

Figure 8:
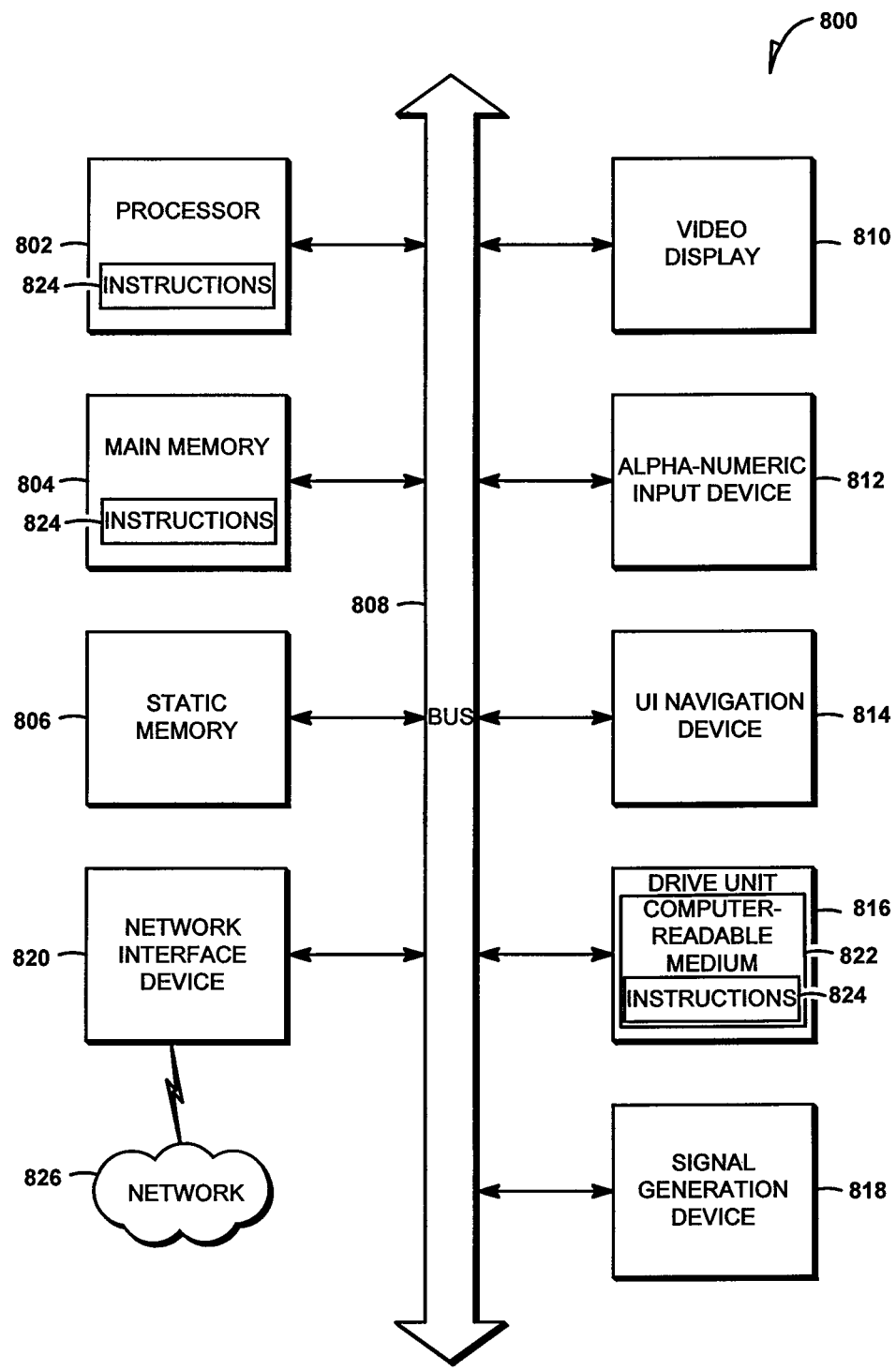
FIG. 8 shows a diagrammatic representation of machine in the example form of a computer system within which a set of instructions may be executed to cause the machine to perform any one or more of the methodologies discussed herein.

FIG. 8 shows a diagrammatic representation of machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of data structures and instructions (e.g., software 824) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

The instructions 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A return fraud protection system comprising:
   a gateway comprising:
      at least one processor;
      a video recording module configured to record a video at an entrance of a store;
      a face capture module configured to capture a face of a customer entering the store from the video and the face of the customer at an item return location in the store;
      a face icon generator module configured to generate a face icon comprising the face of the customer;
      an entrance video clip generator module configured to generate a video clip of the customer entering the store on a same day the customer is at the item return location in the store, to associate the video clip of the customer with the corresponding face icon, and to provide a second client device with a list of face icons with corresponding video clips;
      a face icon matching module, implemented with the at least one processor, configured to match the face of the customer captured at the item return location in the store with the face of the customer captured at the entrance of the store;
      an application module to monitor or control a security device coupled to the gateway, wherein the application module comprises the video recording module, the face capture module, the face icon generator module, and the entrance video clip generator module;
      a communication module configured to enable peer-to-peer communication between a web server, a first client device, the second client device, and other gateways, to receive additional APIs, respective application modules, and respective device drivers, and to copy a configuration of the gateway to other gateways; and
      a remote device management module configured to aggregate monitoring data from the security device and from other security devices respectively coupled to other gateways correlated with the gateway by the web server, and to enable the first and second client device to monitor or control the security device coupled to the respective gateway,
   the web server comprising a web-based gateway management application configured to identify a gateway associated with a user at the first client device, to authenticate with the user at the first client device, to authenticate with the gateway, and to correlate the identified gateway with the other gateways,
   a first client device at the item return location in the store, the first device configured to generate a notification to the second client device in response to determining that an item is being returned by the customer without a receipt at the item return location; and the second client device at a security office location configured to retrieve the face icon corresponding to the face of the customer at the item return location in response to the notification from the first client device, to retrieve video clips only generated the same day of the notification and prior to the notification from the first client device, the video clips associated with the corresponding face icon, and to notify the first client device of a return fraud based on the retrieved video clips of the customer entering the store on the same day that the customer is returning the item without the receipt.

2. The return fraud protection system of claim 1 wherein the entrance video clip generator module is configured to provide the second client device with the list of face icons of the faces of customers entering the store after an opening of the store and before a closing of the store on the same day that the customer is returning the item without the receipt.

3. The return fraud protection system of claim 1 wherein the entrance video clip generator module is configured to receive from the first client device a notification of the customer attempting to return the item without receipt at the item return location in the store, the entrance video clip generator module configured to provide the first client device with the list of face icons of the faces of customers that have entered the store on the same day of the notification from the first client device, within a predetermined amount of time from receiving the notification.

4. The return fraud protection system of claim 1 wherein the face of the customer entering the store and the face of the customer at the item return location in the store are captured on the same day.

5. The return fraud protection system of claim 1 further comprising:
a bar code module configured to identify the item based on a bar code of the item being returned at the item return location in the store;
an aisle identifier module configured to identify an aisle in the store corresponding to the identified item;
an aisle camera identifier module configured to identify a camera associated with the aisle; and
an aisle video clip generator module configured to generate a video clip of the identified aisle in the store within a predetermined amount of time from a time the item is being returned at the item return location in the store.

6. The return fraud protection system of claim 1 wherein the first client device is configured to display a list of face icons of customers substantially matching the face of the customer captured at the return location.

7. The return fraud protection system of claim 1 wherein the gateway comprises:
an application programming interface (API) to interface the gateway with the client device;
a device driver to enable interaction of the application module with the corresponding security device.

8. A computer-implemented method comprising:
recording, at a gateway, a video at an entrance of a store;
capturing, at the gateway, a face of a customer entering the store from the video and the face of the customer at an item return location in the store;
generating, at the gateway, a face icon comprising the face of the customer;
generating, at the gateway, a video clip of the customer entering the store on a same day the customer is at the item return location in the store;

associating, at the gateway, the video clip of the customer with the corresponding face icon;
providing, at the gateway, a second client device with a list of face icons with corresponding video clips;
matching, using at least one processor at the gateway, the face of the customer captured at the item return location in the store with the face of the customer captured at the entrance of the store;
controlling a security device coupled to the gateway;
enabling peer-to-peer communication between a web server, a first client device, the second client device, and other gateways, to receive additional APIs, respective application modules, and respective device drivers; and
copying a configuration of the gateway to other gateways;
aggregating monitoring data from the security device and from other security devices respectively coupled to other gateways correlated with the gateway by the web server, and to enable the first and second client device to monitor or control the security device coupled to the respective gateway,
identifying, at the web server, a gateway associated with a user at the first client device;
authenticating, at the web server, with the user at the first client device;
authenticating, at the web server, with the identified gateway;
correlating, at the web server, the identified gateway with the other gateways;
generating, at a first client device, a notification to the second client device in response to determining that an item is being returned by the customer without a receipt at the item return location; and
retrieving, at the second client device, the face icon corresponding to the face of the customer at the item return location in response to the notification from the first client device, video clips only generated the same day of the notification and prior to the notification from the first client device, the video clips associated with the corresponding face icon, and notifying the first client device of a return fraud based on the retrieved video clips of the customer entering the store on the same day that the customer is returning the item without the receipt.

9. The computer-implemented method of claim 8 further comprising:
providing the second client device with the list of face icons of the faces of the customers entering the store in one day after an opening of the store and before a closing of the store on the same day that the customer is returning the item without the receipt.

10. The computer-implemented method of claim 8 further comprising:
receiving from the first client device a notification of a customer attempting to return the item without receipt at the item return location in the store; and
providing the first client device with the list of face icons of the faces of customers that have entered the store on the same day of the notification from the first client device, within a predetermined amount of time from receiving the notification.

11. The computer-implemented method of claim 8 wherein the face of the customer entering the store and the face of the customer at the item return location in the store are captured on the same day.

12. The computer-implemented method of claim 8 further comprising:
identifying the item based on a bar code of the item being returned at the item return location in the store;

identifying an aisle in the store corresponding to the identified item;

identifying a camera associated with the aisle; and generating a video clip the identified aisle in the store within a predetermined amount of time from a time when the item is being returned at the item return location in the store.

13. The computer-implemented method of claim 8 further comprising:

displaying a list of face icons of customers substantially matching the face of the customer captured at the return location.

14. A non-transitory computer-readable storage medium storing a set of instructions that, when executed by a processor, cause the processor to perform operations, comprising:

recording, at a gateway, a video at an entrance of a store;

capturing, at the gateway, a face of a customer entering the store from the video and the face of the customer at an item return location in the store;

generating, at the gateway, a face icon comprising the face of the customer;

generating, at the gateway, a video clip of the customer entering the store on a same day the customer is at the item return location in the store;

associating, at the gateway, the video clip of the customer with the corresponding face icon;

providing, at the gateway, a second client device with a list of face icons with corresponding video clips;

matching, using at least one processor at the gateway, the face of the customer captured at the item return location in the store with the face of the customer captured at the entrance of the store;

controlling a security device coupled to the gateway;

enabling peer-to-peer communication between a web server, a first client device, the second client device, and other gateways, to receive additional APIs, respective application modules, and respective device drivers; and copying a configuration of the gateway to other gateways;

aggregating monitoring data from the security device and from other security devices respectively coupled to other gateways correlated with the gateway by the web server, and to enable the first and second client device to monitor or control the security device coupled to the respective gateway, identifying, at the web server, a gateway associated with a user at the first client device;

authenticating, at the web server, with the user at the first client device;

authenticating, at the web server, with the identified gateway;

correlating, at the web server, the identified gateway with the other gateways;

generating, at a first client device, a notification to the second client device in response to determining that an item is being returned by the customer without a receipt at the item return location; and retrieving, at the second client device, the face icon corresponding to the face of the customer at the item return location in response to the notification from the first client device, video clips only generated the same day of the notification and prior to the notification from the first client device, the video clips associated with the corresponding face icon, and notifying the first client device of a return fraud based on the retrieved video clips of the customer entering the store on the same day that the customer is returning the item without the receipt.

15. The non-transitory computer-readable storage medium of claim 14 further comprising:

providing the second client device with the list of face icons of the faces of the customers entering the store in one day after an opening of the store and before a closing of the store on the same day that the customer is returning the item without the receipt.

16. The non-transitory computer-readable storage medium of claim 14 further comprising:

receiving from the first client device a notification of a customer attempting to return the item without receipt at the item return location in the store; and providing the first client device with the list of face icons of the faces of customers that have entered the store on the same day of the notification from the first client device, within a predetermined amount of time from receiving the notification.

17. The non-transitory computer-readable storage medium of claim 14 wherein the face of the customer entering the store and the face of the customer at the item return location in the store are captured on the same day.

18. The non-transitory computer-readable storage medium of claim 14 further comprising:

identifying the item based on a bar code of the item being returned at the item return location in the store;

identifying an aisle in the store corresponding to the identified item;

identifying a camera associated with the aisle; and generating a video clip the identified aisle in the store within a predetermined amount of time from a time the item is being returned at the item return location in the store.

19. The non-transitory computer-readable storage medium of claim 14 further comprising:

displaying a list of face icons of customers substantially matching the face of the customer captured at the return location.

* * * * *